United States Patent
Nagayama et al.

(10) Patent No.: US 11,062,854 B2
(45) Date of Patent: Jul. 13, 2021

(54) SOLID ELECTROLYTIC CAPACITOR AND METHOD FOR MANUFACTURING SAME

(71) Applicant: Panasonic Intellectual Property Management Co., Ltd., Osaka (JP)

(72) Inventors: Hiroki Nagayama, Kyoto (JP); Kouta Muneyasu, Osaka (JP); Makoto Nagashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 171 days.

(21) Appl. No.: 16/430,480

(22) Filed: Jun. 4, 2019

(65) Prior Publication Data

US 2019/0287732 A1    Sep. 19, 2019

Related U.S. Application Data

(63) Continuation of application No. PCT/JP2017/043903, filed on Dec. 7, 2017.

(30) Foreign Application Priority Data

Dec. 28, 2016    (JP) .............................. JP2016-254604

(51) Int. Cl.
*H01G 9/15*    (2006.01)
*H01G 9/00*    (2006.01)
(Continued)

(52) U.S. Cl.
CPC ............. *H01G 9/15* (2013.01); *H01G 9/0029* (2013.01); *H01G 9/012* (2013.01); *H01G 9/08* (2013.01); *H01G 9/26* (2013.01); *H01G 9/04* (2013.01)

(58) Field of Classification Search
CPC ............. H01G 9/008; H01G 9/08; H01G 9/15
See application file for complete search history.

(56) References Cited

U.S. PATENT DOCUMENTS

| | | | |
|---|---|---|---|
| 2013/0120903 A1 | 5/2013 | Pan et al. | |
| 2015/0262759 A1* | 9/2015 | Ishizaki | H01G 9/15 |
| | | | 361/528 |

FOREIGN PATENT DOCUMENTS

| | | |
|---|---|---|
| CN | 103107021 A | 5/2013 |
| JP | 2007-165777 | 6/2007 |
| JP | 2011-091444 | 5/2011 |

OTHER PUBLICATIONS

English Translation of Chinese Search Report dated Sep. 23, 2020 for the related Chinese Patent Application No. 201780079779.2.
(Continued)

*Primary Examiner* — Eric W Thomas
(74) *Attorney, Agent, or Firm* — McDermott Will and Emery LLP

(57) ABSTRACT

A solid electrolytic capacitor includes an element laminated body, an anode lead, a cathode lead, a coating layer, and an outer packaging resin. In the element laminated body, a plurality of capacitor elements each having an anode part and a cathode part are laminated. The anode lead is connected to a laminated anode part of the element laminated body. The laminated anode part is a part laminated by a plurality of anode part which include the anode part. The cathode lead is connected to a laminated cathode part of the element laminated body. The laminated cathode part is a part laminated by a plurality of cathode part which include the cathode part. The coating layer fills at least a part of a gap between the plurality of capacitor elements. The outer packaging resin seals the element laminated body together with a part of the anode lead and a part of the cathode lead.

5 Claims, 2 Drawing Sheets

(51) Int. Cl.
*H01G 9/012* (2006.01)
*H01G 9/08* (2006.01)
*H01G 9/26* (2006.01)
*H01G 9/04* (2006.01)

(56) References Cited

OTHER PUBLICATIONS

International Search Report of PCT application No. PCT/JP2017/043903 dated Feb. 27, 2018.

* cited by examiner

SOLID ELECTROLYTIC CAPACITOR AND METHOD FOR MANUFACTURING SAME

RELATED APPLICATIONS

This application is a continuation of the PCT International Application No. PCT/JP2017/043903 filed on Dec. 7, 2017, which claims the benefit of foreign priority of Japanese patent application No. 2016-254604 filed on Dec. 28, 2016, the contents all of which are incorporated herein by reference.

BACKGROUND

1. Technical Field

The present disclosure relates to a solid electrolytic capacitor including a plurality of laminated capacitor elements.

2. Description of the Related Art

Solid electrolytic capacitors are mounted to various electronic devices because of their low equivalent series resistance (ESR) and excellent frequency characteristics. Particularly, a solid electrolytic capacitor including a plurality of capacitor elements is excellent in that the capacitance can be increased and the degree of freedom in design is high. Each of the capacitor elements includes an anode body having a dielectric layer, and a cathode part. As the anode body, foils of valve metals such as titanium, tantalum, aluminum, and niobium are used.

The dielectric layer on a surface of the anode body is covered with a solid electrolyte layer constituting the cathode part, and the solid electrolyte layer is covered with a cathode lead-out layer. In the capacitor elements adjacent to each other, the anode bodies are joined to each other, and the cathode lead-out layers are joined to each other by a conductive adhesive (see, Unexamined Japanese Patent Publication No. 2011-91444).

SUMMARY

A solid electrolytic capacitor according to one aspect of the present disclosure includes an element laminated body, an anode lead, a cathode lead, a coating layer, and an outer packaging resin. In the element laminated body, a plurality of capacitor elements each having an anode part and a cathode part are laminated. The anode lead is connected to a laminated anode part of the element laminated body. The laminated anode part is a part laminated by a plurality of anode part which include the anode part. A cathode lead is connected to a laminated cathode part of the element laminated body. The laminated cathode part is a part laminated by a plurality of cathode part which include the cathode part. The coating layer fills at least a part of a gap between the plurality of capacitor elements. The outer packaging resin seals the element laminated body together with a part of the anode lead and a part of the cathode lead.

A method for manufacturing a solid electrolytic capacitor according to another aspect of the present disclosure includes first to third steps below. In the first step, an element laminated body in which a plurality of capacitor elements each having an anode part and a cathode part are laminated, an anode lead connected to a laminated anode part of the element laminated body, and a cathode lead connected to a laminated cathode part of the element laminated body. The laminated anode part is a part laminated by a plurality of anode part which include the anode part. The laminated cathode part is a part laminated by a plurality of cathode part which include the cathode part. In the second step, a coating layer is formed to fill at least a part of a gap between the plurality of capacitor elements. In the third step, an outer packaging resin is formed to seal the element laminated body provided with the coating layer, together with a part of the anode lead and a part of the cathode lead.

According to the present disclosure, airtightness of the solid electrolytic capacitor can be improved, and degradation of the cathode part can be suppressed.

DETAILED DESCRIPTION OF EMBODIMENT

Figure 1:
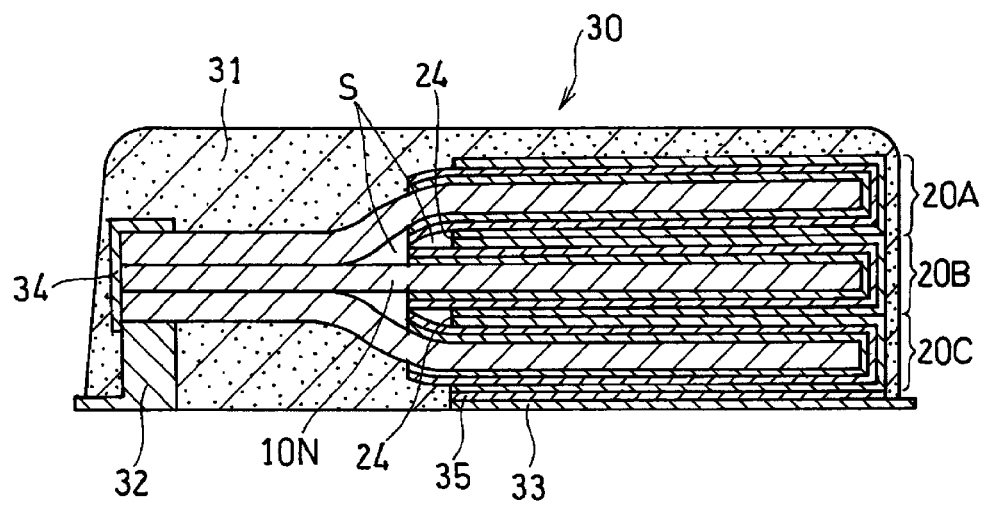
FIG. 1 is a longitudinal cross-sectional view illustrating an example of a solid electrolytic capacitor including a plurality of capacitor elements.

In a case of a solid electrolytic capacitor including a plurality of laminated capacitor elements, a gap is formed between the capacitor elements due to a difference in thickness of a laminated portion. Particularly, a gap is likely to be formed near a boundary between a cathode part and an anode part. A laminate body of the capacitor elements is sealed with a mold resin (outer packaging resin) forming an outer packaging. However, along with miniaturization of the capacitor element, it has become difficult to cause a mold resin to infiltrate into a gap between the capacitor elements. When a gap remains between the capacitor elements even after an outer packaging has been formed, the airtightness is sharply reduced in case that a slight crack is generated in the outer packaging in a mounting process or the like. As a result, degradation of the cathode part proceeds, and the ESR of the solid electrolytic capacitor may increase.

The solid electrolytic capacitor according to an embodiment of the present disclosure is provided with an element laminated body, and the element laminated body includes a plurality of laminated capacitor elements. The plurality of capacitor elements each have an anode part and a cathode part. The plurality of capacitor elements are laminated such that the anode parts overlap each other and the cathode parts overlap each other. Thus, the element laminated body has a laminated anode part in which the anode parts are laminated, and a laminated cathode part in which the cathode parts are laminated. An anode lead is electrically connected to the laminated anode part, and a cathode lead is electrically connected to the laminated cathode part. The anode lead and the cathode lead are each formed of a metallic material. And, for example, they are formed of a material cut out of a plate of metal material. A part of the anode lead and a part of the cathode lead function as an external terminal of an anode and an external terminal of a cathode, respectively.

A gap is inevitably formed between the plurality of capacitor elements. At least a part of such a gap is filled by a coating layer. The element laminated body in which the gap is filled by the coating layer is sealed with the outer packaging resin together with a part of the anode lead and a part of the cathode lead. Another part of the anode lead functioning as the external terminal of the anode and another part of the cathode lead functioning as the external terminal of the cathode are each led out to the outside without being covered with the outer packaging resin.

The capacitor element includes, for example, an anode body forming the anode part, a dielectric layer covering at least a part of the anode body, and the cathode part. The cathode part includes, for example, a solid electrolyte layer covering at least a part of the dielectric layer, and a cathode lead-out layer covering at least a part of the solid electrolyte layer. The solid electrolyte layer may have an exposed portion not covered by the cathode lead-out layer. The exposed portion of the solid electrolyte layer is likely to be formed at a boundary between the anode part and the cathode part. By bringing at least a part of the exposed portion of the solid electrolyte layer into contact with the coating layer, the exposed portion can be protected. The coating layer preferably covers the exposed portion of the solid electrolyte layer as much as possible.

Figure 2:
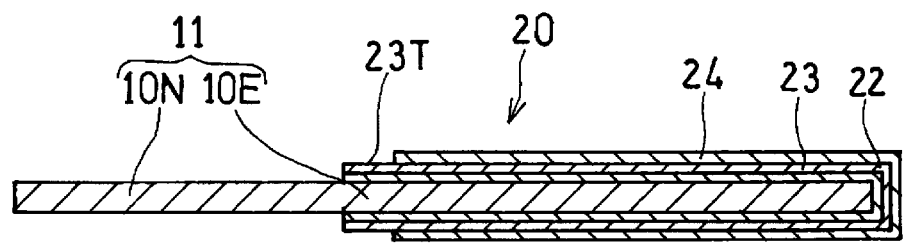
FIG. 2 is a cross-sectional view schematically illustrating an example of the capacitor element.

FIG. 1 is a cross-sectional view schematically illustrating solid electrolytic capacitor 30 including a plurality of capacitor elements 20 (20A to 20C). FIG. 2 is a cross-sectional view schematically illustrating a structure of capacitor element 20. The plurality of laminated capacitor elements 20A to 20C are connected to each other by a conductive adhesive (not shown) disposed between the cathode parts. Each of the plurality of capacitor elements 20 includes foil-like anode body 11 having anode part 10N and region 10E in which dielectric layer 22 is formed. Dielectric layer 22 is covered with solid electrolyte layer 23, and solid electrolyte layer 23 is covered with cathode lead-out layer 24. Solid electrolyte layer 23 and cathode lead-out layer 24 form a cathode part of capacitor element 20.

When the plurality of capacitor elements 20 are laminated as described above, a difference between a thickness of the laminated anode part where anode parts 10N overlap each other and a thickness of the laminated cathode part where the cathode parts overlap each other is generated. Gap S is formed between capacitor elements 20 in the element laminated body due to such difference in thickness. Particularly, as shown in FIG. 1, gap S is likely to be formed near a boundary between cathode lead-out layer 24 and anode part 10N. At such a boundary, as shown in FIG. 2, exposed portion 23T of solid electrolyte layer 23 is likely to be formed. Accordingly, when an outside air intrudes into gap S, degradation of solid electrolyte layer 23 due to oxidation or moisture progresses from exposed portion 23T, and the ESR of solid electrolytic capacitor 30 increases.

In FIG. 1, anode lead 34 having external terminal 32 bent and formed into a predetermined shape is electrically connected to the laminated anode part. External terminal 32 may be integral with the remaining portion of anode lead 34 or may be a separate member. Flat cathode lead 33 is electrically connected to a laminated cathode part via conductive adhesive 35. An outer surface of cathode lead 33 functions as an external terminal. Although the element laminated body including the plurality of capacitor elements 20 is sealed by outer packaging resin 31, external terminal 32 as a part of anode lead 34 and an external terminal of cathode lead 33 are exposed from outer packaging resin 31.

Anode body 11 is formed, for example, by etching a metal foil. The laminated anode parts in which the plurality of anode parts 10N are stacked are electrically connected to each other by being caulked and integrated by anode lead 34. However, a method for joining anode parts 10N to one another is not particularly limited, and the anode parts may be joined by laser welding or resistance welding.

(Coating Layer)

Figure 3:
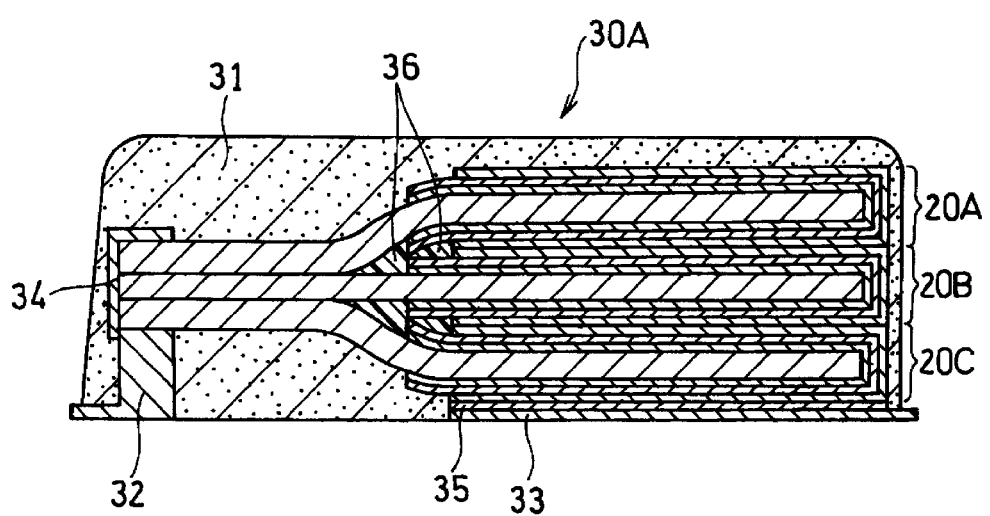
FIG. 3 is a longitudinal cross-sectional view illustrating an example of a solid electrolytic capacitor in which a gap between the capacitor elements is filled by a coating layer.

Although a coating layer is not illustrated in gap S in FIG. 1, at least a part of gap S is filled with coating layer 36 in solid electrolytic capacitor 30A according to the embodiment of the present disclosure as shown in FIG. 3. Coating layer 36 may be formed to cover not only gap S of the element laminated body but also at least a part of an outer peripheral surface of the element laminated body.

After the element laminated body, the anode lead connected to the laminated anode part of the element laminated body, and the cathode lead connected to the laminated cathode part of the element laminated body are prepared, coating layer 36 is formed so as to fill at least a part of gap S between the capacitor elements.

Various materials can be used to form the coating layer filling the gap between the capacitor elements. However, it is preferable to form the coating layer by causing a liquid composition to infiltrate into gap S between the capacitor elements. By causing the liquid composition to infiltrate into a minute gap, the gap can be easily filled by capillary action. By using a dispenser or the like, the liquid composition can be applied to a desired location of a small-sized element laminated body. Thus, the liquid composition is unlikely to adhere to the anode lead and the cathode lead. Hence, the subsequent step of molding the outer packaging resin is not inhibited, and the external terminal is not contaminated.

As the coating layer, an inorganic material film such as a silica film, a resin film or the like is preferred. The inorganic material film can be formed by a sol-gel method, application of a polysilazane solution, or the like. The resin film is preferably formed by using a resin composition which is liquid at normal temperature (from 25° C. to 30° C. inclusive). The liquid resin composition (hereinafter also referred to as the first resin composition) is suitable for filling the gap between the capacitor elements.

The first resin composition may be a thermosetting resin composition or photocurable resin composition, or may be a thermoplastic resin composition. The first resin composition may contain a volatile solvent. When the first resin composition contains a volatile solvent, a step of removing the solvent by drying may be performed when the coating layer is formed.

The first resin composition has a viscosity at 25° C. of preferably less than or equal to 100 Pa·s, more preferably less than or equal to 10 Pa·s. Viscosity measurement may be performed at a rotational speed of 100 rpm using a B-type viscometer.

Examples of a resin component of the first resin composition include epoxy resin, phenol resin, silicone resin, polyurethane, polyimide, polyamide-imide, and unsaturated polyester. Among them, epoxy resin is preferred.

The coating layer may not include a filler, but preferably includes a filler in order to reduce a difference in linear expansion coefficient between materials constituting the capacitor element or a difference in linear expansion coefficient between the outer packaging resin and the coating layer. By including a filler with a small average particle diameter in the coating layer, it is possible to further improve a reliability of the solid electrolytic capacitor. Hereinafter, the filler included in the coating layer is referred to as a first filler. Since it needs only slight amount of the first resin composition to cause the first resin composition to infiltrate into a minute gap, a relatively expensive material for the first filler can be used. The type of the first filler is not particularly limited, and silica, alumina or the like can be used.

The size of the gap between the capacitor elements in the element laminated body depends on the size of the solid electrolytic capacitor. However, the size of the gap usually ranges from 20 µm to 100 µm, inclusive, in many cases. The average particle diameter D1 of the first filler is preferably smaller than the size of the gap between the capacitor elements. Further, the average particle diameter D1 of the first filler is preferably smaller than an average particle diameter D2 of a second filler that is to be described later. The average particle diameter D1 of the first filler is preferably less than or equal to 30 µm, more preferably less than or equal to 10 µm. The average particle diameter of the filler is defined as the particle size at a cumulative volume in a volume-based particle size distribution of 50%, and can be measured by a laser diffraction-type particle size distribution measuring apparatus.

(Outer Packaging Resin)

The outer packaging resin forms an outer packaging of the solid electrolytic capacitor. The outer packaging resin is formed such that the element laminated body is sealed together with a part of the anode lead and a part of the cathode lead after the step of filling at least a part of the gap between the capacitor elements with the coating layer.

A volume of the outer packaging resin is significantly larger than a volume of the coating layer for filling a minute gap. Accordingly, a relatively inexpensive resin composition (hereinafter, also referred to as a second resin composition) is used for the outer packaging resin. The outer packaging resin is preferably formed in a transfer molding step. A melt viscosity at the time of molding the second resin composition is not particularly limited, but the melt viscosity is usually more than or equal to 30 Pa·s.

Usually, it is difficult to cause the second resin composition to infiltrate into a minute gap. Along with miniaturization of the solid electrolytic capacitor, it is becoming more and more difficult to cause the second resin composition to infiltrate into the minute gap between the capacitor elements. On the other hand, the smaller the capacitor element is, the greater an influence of the minute gap on airtightness is. In contrast, internal airtightness of the solid electrolytic capacitor can be easily improved by filling the minute gap between the capacitor elements with the coating layer in advance, and the reliability of the solid electrolytic capacitor can be improved.

Examples of a resin component of the second resin composition include epoxy resin, phenol resin, silicone resin, melamine resin, urea resin, alkyd resin, polyurethane, polyimide, polyamide-imide, and unsaturated polyester. Among them, epoxy resin is preferred.

The outer packaging resin preferably includes a filler. Hereinafter, the filler included in the outer packaging resin is referred to as a second filler. The average particle diameter of the second filler is not particularly limited and is, for example, preferably less than or equal to 100 µm, more preferably less than or equal to 60 µm. The type of the second filler is not particularly limited, and silica, alumina or the like can be used.

Next, components of the solid electrolytic capacitor will be further described.

(Anode Body)

The anode body constituting the anode part includes a valve metal, and is foil (metallic foil) having a first main surface and a second main surface opposite to the first main surface. As the valve metal, titanium, tantalum, aluminum, niobium, or the like is used. A thickness of the anode body is not particularly limited, but ranges from 50 µm to 250 µm, inclusive, for example.

(Dielectric Layer)

The dielectric layer is formed, by anodizing a surface of the anode body through an anodizing treatment, for example. When aluminum is used as the valve metal, the dielectric layer including $Al_2O_3$ is formed. The dielectric layer may be any layer other than these examples, as long as the layer functions as a dielectric.

(Solid Electrolyte Layer)

The solid electrolyte layer preferably includes a conductive polymer. The conductive polymers may be polypyrrole, polythiophene, polyfuran, polyaniline, polyacetylene, polyphenylene, polyphenylene vinylene, polyacene, and/or polythiophene vinylene, and derivatives of these polymers, for example. The solid electrolyte layer including a conductive polymer can be formed through chemical polymerization and/or electrolytic polymerization of raw material monomer on a dielectric layer. Alternatively, the solid electrolyte layer including a conductive polymer can be formed by coating the dielectric layer with a solution in which the conductive polymer is dissolved or a dispersion liquid in which the conductive polymer is dispersed.

(Cathode Lead-Out Layer)

The cathode lead-out layer may have a configuration having a current collection function and includes, for example, a carbon layer and a metal (e.g., silver) paste layer formed on a surface of the carbon layer. The carbon layer is made of a composition containing a conductive carbon material. The metal paste layer is made of, for example, a resin paste in which silver particles are dispersed.

Next, an exemplary embodiment of the present disclosure will be described based on examples. A solid electrolytic capacitor as shown in FIG. 3 was produced, and ESR characteristics of the solid electrolytic capacitor were evaluated.

EXAMPLE 1

(1) Production of Capacitor Element

An aluminum foil (with a thickness of 100 µm) was prepared as a base material, and etching was performed on a part of a surface of the aluminum foil, so as to obtain an anode body.

The anode body was immersed in a phosphate acid solution in a concentration of 0.3% by mass (at a liquid temperature of 70° C.), and a DC voltage of 70 V was applied for 20 minutes, thereby forming a dielectric layer including an aluminum oxide ($Al_2O_3$) on a surface of the anode body.

The anode body formed with the dielectric layer is immersed in an aqueous dispersion (with a concentration of 2% by mass) of poly(3,4-ethylenedioxythiophene) (PEDOT) doped with polystyrenesulfonic acid (PSS) and then dried to form a solid electrolyte layer.

An aqueous dispersion of graphite particles was applied to the solid electrolyte layer and then dried to form a carbon layer on a surface of the solid electrolyte layer. Then, an epoxy resin composition (sliver paste) containing silver particles was applied onto a surface of the carbon layer, and thereafter, the resin was cured by heating to form a silver paste layer. In this manner, a cathode lead-out layer constituted of the carbon layer and the silver paste layer was formed.

(2) Production of Element Laminated Body

A total of three capacitor elements were stacked, and a conductive adhesive was interposed between cathode lead-out layers of the adjacent capacitor elements to bond the capacitor elements, thereby forming an element laminated body. An anode lead was connected to a laminated anode part of the element laminated body, and a cathode lead was connected to a laminated cathode part.

(3) Formation of Coating Layer

A first resin composition in a liquid state mainly composed of an epoxy resin containing 30% by mass of spherical silica having an average particle diameter of 0.6 μm was prepared. The obtained first resin composition was applied dropwise from a dispenser to a side surface of the element laminated body, and filled in a gap by using capillary action. Thereafter, the first resin composition was cured by heating at 80° C. to form a coating layer.

(4) Formation of Outer Packaging Resin (Outer Packaging)

The element laminated body formed with the coating layer is disposed in a mold, and a second resin composition mainly composed of an epoxy resin containing 74% by mass of silica having an average particle diameter of 50 μm is subjected to transfer molding to form an outer packaging resin.

COMPARATIVE EXAMPLE 1

A solid electrolytic capacitor was produced in the same manner as in Example 1 except that no coating layer was formed.

[Evaluation]

Thirty samples of the solid electrolytic capacitors were fabricated for each of Example 1 and Comparative Example 1. Initial ESR values of the thirty samples in an environment of 20° C. were measured at a frequency of 100 kHz using an LCR meter for four-terminal measurement, and an average value ($X_0$) was determined. Next, all samples were continued to be heated at 145° C. for 500 hours, after which the ESR values were measured, and an average value ($X_1$) was likewise determined.

Then, the ratio of change in ESR was calculated by the following formula. The results are shown in Table 1.

Ratio of change (%)=($X_1$-$X_0$)/$X_0$×100

TABLE 1

| | Ratio of change in ESR (%) |
|---|---|
| Comparative Example 1 | 205 |
| Example 1 | 23 |

In Example 1, the ratio of change in ESR was smaller than that in Comparative Example 1. This is considered to be due to the fact that internal sealability of the solid electrolytic capacitor is enhanced by the coating layer, so that it becomes less susceptible to infiltration of outside air.

The solid electrolytic capacitor according to the present disclosure is suitable, for example, for use in a high temperature environment for a long period of time.

What is claimed is:

1. A solid electrolytic capacitor comprising:
   an element laminated body in which a plurality of capacitor elements each having an anode part and a cathode part are laminated;
   an anode lead connected to a laminated anode part of the element laminated body, the laminated anode part being a part laminated by a plurality of anode parts which include the anode part;
   a cathode lead connected to a laminated cathode part of the element laminated body, the laminated cathode part being a part laminated by a plurality of cathode parts which include the cathode part;
   a coating layer that fills at least a part of a gap that is located between the plurality of capacitor elements, and located in the laminated cathode part of the element laminated body; and
   an outer packaging resin that seals the element laminated body together with a part of the anode lead and a part of the cathode lead.

2. The solid electrolytic capacitor according to claim 1, wherein:
   each of the plurality of capacitor elements includes an anode body providing the anode part, and a dielectric layer covering at least a part of the anode body,
   the cathode part includes a solid electrolyte layer covering at least a part of the dielectric layer, and a cathode lead-out layer covering at least a part of the solid electrolyte layer,
   the solid electrolyte layer has an exposed portion that is not covered by the cathode lead-out layer, and
   at least a part of the exposed portion is in contact with the coating layer.

3. The solid electrolytic capacitor according to claim 1, wherein:
   the coating layer includes a first filler,
   the outer packaging resin includes a second filler, and
   an average particle diameter of the first filler is smaller than an average particle diameter of the second filler.

4. A method for manufacturing a solid electrolytic capacitor, the method comprising:
   a first step of preparing an element laminated body in which a plurality of capacitor elements each having an anode part and a cathode part are laminated, an anode lead connected to a laminated anode part of the element laminated body, and a cathode lead connected to a laminated cathode part of the element laminated body, the laminated anode part being a part laminated by a plurality of anode parts which include the anode part, the laminated cathode part being a part laminated by a plurality of cathode parts which include the cathode part;
   a second step of forming a coating layer that fills at least a part of a gap that is located between the plurality of capacitor elements, and located in the laminated cathode part of the element laminated body; and
   a third step of forming an outer packaging resin that seals the element laminated body provided with the coating layer, together with a part of the anode lead and a part of the cathode lead.

5. The method for manufacturing a solid electrolytic capacitor according to claim 4, wherein the second step includes a step of causing a liquid composition to infiltrate into the gap.

* * * * *